R. H. SIMONDS.
EYEGLASSES.
APPLICATION FILED MAR. 10, 1909.
958,839.
Patented May 24, 1910.
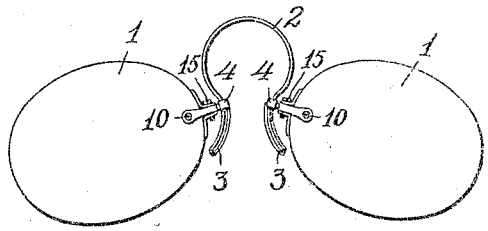
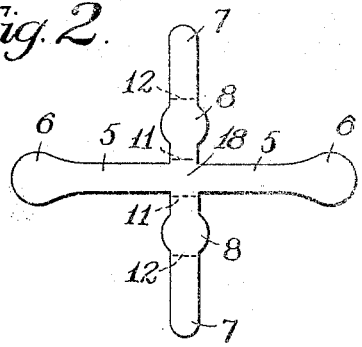
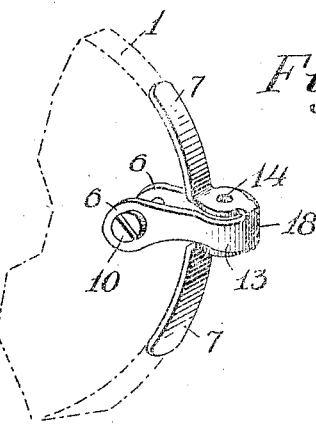
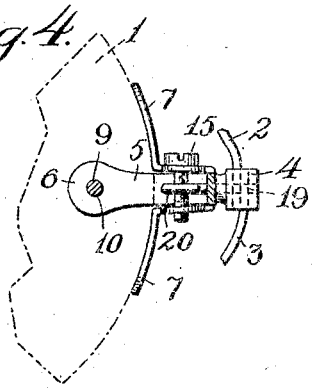
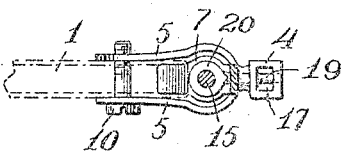
Witnesses
R. D. Tolman
Penelope Cumberbach
Inventor
Royal H. Simonds.
By Rufus B. Fowler
Attorney

UNITED STATES PATENT OFFICE.

ROYAL H. SIMONDS, OF SOUTHBRIDGE, MASSACHUSETTS.

EYEGLASSES.

958,839.        Specification of Letters Patent.      Patented May 24, 1910.

Application filed March 10, 1909. Serial No. 482,514.

*To all whom it may concern:*

Be it known that I, ROYAL H. SIMONDS, a citizen of the United States, residing at Southbridge, in the county of Worcester and Commonwealth of Massachusetts, have invented a new and useful Improvement in Eyeglasses, of which the following is a specification, accompanied by drawings forming a part of the same, in which—

Figure 1 is a front view of a pair of eyeglasses embodying my invention. Figs. 2, 3, 4 and 5 are enlarged views, showing my improved construction of mount for eyeglass and attachment for box stud.

Similar reference figures refer to similar parts in the different views.

My invention relates to a rimless eyeglass having a spring and nose guard held in a box stud attached to one end of the lens, and it comprises an improved apparatus for mounting the lens in order to attach the box stud thereto, consisting in the construction and arrangement of parts as hereinafter described and pointed out in the annexed claims.

In the ordinary construction of mount for a rimless eyeglass in order to attach the box stud thereto, the box stud itself is provided with an integral neck, at the end of which are a pair of parallel arms arranged to embrace the faces of the lens, and which are held in contact therewith by a screw passing through both arms and the lens itself. Integral braces are also provided on either side of the box stud which contact with the edge of the lens, and are designed to hold the stud from lateral movement on the screw. A tight fit between the box stud and lens is maintained by tightening the screw and by bending the braces as required.

In my improved construction, I provide an elastic member with parallel arms to embrace the end of the lens, and a screw to hold the arms in position. Movement of the member, with reference to the lens, is prevented by elastic braces, arranged to contact with the edge of the lens upon each side of said parallel arms and exert a strain upon the screw in a direction parallel with the longitudinal diameter of the lens, with means for tightening the elastic braces to regulate the amount of strain. I also securely attach the box stud to the outer side of the elastic member, and provide means for securing the ends of the spring and nose guard in the box stud.

Referring to the accompanying drawings, 1, 1, are the lenses connected by a spring 2, and having nose guards 3, 3, with the ends of the spring and nose guards held in the boxes 4, 4, in a manner hereinafter pointed out.

The mounting of the lenses, by which the boxes are attached to the lenses, is accomplished as follows:—A cross-shaped blank is stamped from a suitably elastic material in the form shown in Fig. 2, having arms 5, 5, with enlarged ends 6. Braces 7, 7, integral with the arms 5, extend at right angles thereto, and each brace 7 is provided with an enlargement 8 located at a suitable distance from the arms 5, for a purpose to be later pointed out.

The arms 5 are bent at their point of union, with the braces 7 parallel with the edges of the enlargements 8, and are then bent approximately parallel to contact with the faces of the lens, as shown in Fig. 5. The enlarged ends 6 are provided with concentric openings 9 to receive a screw 10. The side braces 7 are bent at right angles to the arms 5, upon the dotted lines 11, 11, shown in Fig. 2. A second bend upon the dotted lines 12, 12, of Fig. 2 is imparted to the braces 7, bringing the end of each brace beyond the enlargement 8 parallel with the edge of the lens, with which it is designed to contact when the member 13 is in position, as shown in Figs. 3, 4 and 5. The enlargements 8 of the braces 7 are now opposite, and concentric openings 14 are provided in the enlargements 8 to receive a screw 15, as shown in Fig. 4.

It is apparent that, when the member 13 is in position upon the edge of the lens, tightening the screw 15 will cause the approach of the enlargements 8 and, owing to the elasticity of the braces 7, tend to force the member 13 away from the end of the lens, thereby exerting an outward strain upon the screw 10, which will hold it securely in position and prevent movement of the member 13 with respect to the lens. Before, however, the member 13 is placed in position, the box stud 4 with the usual transverse opening 17 is attached to the surface 18 on the member 13, by solder or equivalent means, as shown in Figs. 4 and 5. A longitudinal hole is then bored through the member 13 and the box stud 4, intersecting the transverse opening 17, for the insertion of a retaining pin 19, as shown by dotted lines in Figs. 4 and 5. The inner end of the pin 19 is provided with an eye 20, arranged to be engaged by the screw 15 and thereby held in position. The ends of the spring 2 and nose guards 3, designed to be inserted in the opening 17, are provided with openings to receive the pin 19.

My improved eyeglass is mounted as follows:—After the member 13 has received the form shown in Fig. 3, the box stud attached and the longitudinal hole prepared, the spring 2 and nose guards 3 are placed in their proper position with their ends overlapping and inserted in the opening 17. The retaining pin 19 is then inserted into the longitudinal hole, engaging the ends of the spring 2 and nose guards 3. The screw 15 is inserted through the openings 14 in the enlargements 8, passing through the eye 20 between them. The lens 1 is then placed between the arms 5, and the screw 10 is employed to bring the enlarged ends 6 into contact with the faces of the lens 1. The screw 15 is then tightened, and an outward strain is brought upon the screw 10 to hold it securely in position and prevent movement of the member 13 upon the lens 1. I thus provide a mounting for an eyeglass in which, by the screw 15, the member 13 is held firmly upon the lens, and in which the same screw is employed to hold the spring 2 and nose guards 3 securely in the box stud by the pin 19. Removal of this screw loosens the member 13 from the lens, and allows the withdrawal of the pin 19, thereby loosening the spring 2 and nose guards 3 in the box stud. The only functions performed by the screw 10 are holding the ends 6 in contact with the lens and receiving the outward strain upon the member 13 exerted by the elastic braces 7. No tightening of the screw 10 is required. If for any reason the member 13 becomes loose upon the lens, it can be tightened by tightening the screw 15. No bending of the braces 7 is required after the member 13 has once been formed.

I claim,

1. A mount for an eyeglass for attaching a box stud thereto, comprising a pair of arms formed from elastic material, means for holding said arms in contact with the opposite faces of the lens and preventing their movement toward the edge of the lens, a pair of braces integral with said arms in contact with the edge of the lens, and means for varying the pressure of said elastic braces upon the edge of the lens.

2. A mount for an eyeglass, comprising a pair of arms formed from elastic material, means for holding said arms in contact with the opposite faces of the lens and preventing their movement toward the edge of the lens, a pair of braces integral with said arms, each brace bent at right angles thereto and with a second bend parallel and in contact with the edge of the lens, a screw connecting said braces between said bends, whereby the distance between said braces may be varied, and a box stud attached to said arms between said braces.

3. A mount for an eyeglass for attaching a box stud thereto, comprising a pair of arms formed of elastic material arranged to contact with the opposite faces of the lens, means transverse to said lens connecting said arms, a pair of braces integral with said arms, bent to contact with the edge of said lens upon either side of said arms, and means for varying the distance between said contacting braces in order to vary the pressure exerted by said braces upon said arms.

4. An eyeglass, means for attaching a box stud thereto, comprising a member having arms attached to the faces of the lens, said arms extending beyond the edge of the lens, elastic braces on each side of said arms bent at right angles to the outer end of said arms and thereby parallel, then bent outwardly to contact with the edge of the lens, and a screw connecting the parallel portions of said braces.

5. An eyeglass, a box stud having a transverse opening and a longitudinal hole intersecting said opening, and means for attaching said box stud to the lens of said eyeglass, comprising a member attached to said lens having a plane surface to receive said box stud, said plane surface having an opening concentric with said longitudinal hole, a pin inserted through the opening in said surface and said longitudinal hole, with the outer end of said pin provided with an eye, and a screw in said member in engagement with said eye.

6. A mount for an eyeglass for attaching a box stud thereto, comprising a pair of arms bent to inclose a cylindrical space, with their free ends attached to and in contact with the faces of the lens, elastic braces integral with said arms bent at right angles thereto, extending over each end of said cylindrical space and bent outwardly to contact with the edge of the lens, a screw connecting said braces passing through said cylindrical space, a box stud attached to said arms, and a pin passing longitudinally through said box stud and extending into said cylindrical space at right angles to said screw.

ROYAL H. SIMONDS.

Witnesses:
PENELOPE COMBERBACH,
NELLIE WHALEN.